April 7, 1970     V. C. MILWARD     3,504,752
MECHANISM FOR SNOW VEHICLE
Filed Dec. 5, 1967     3 Sheets-Sheet 1
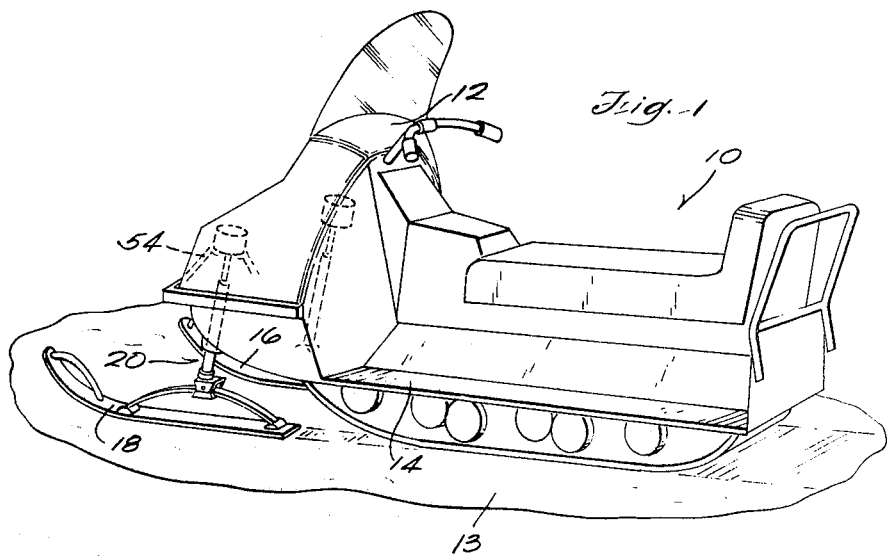
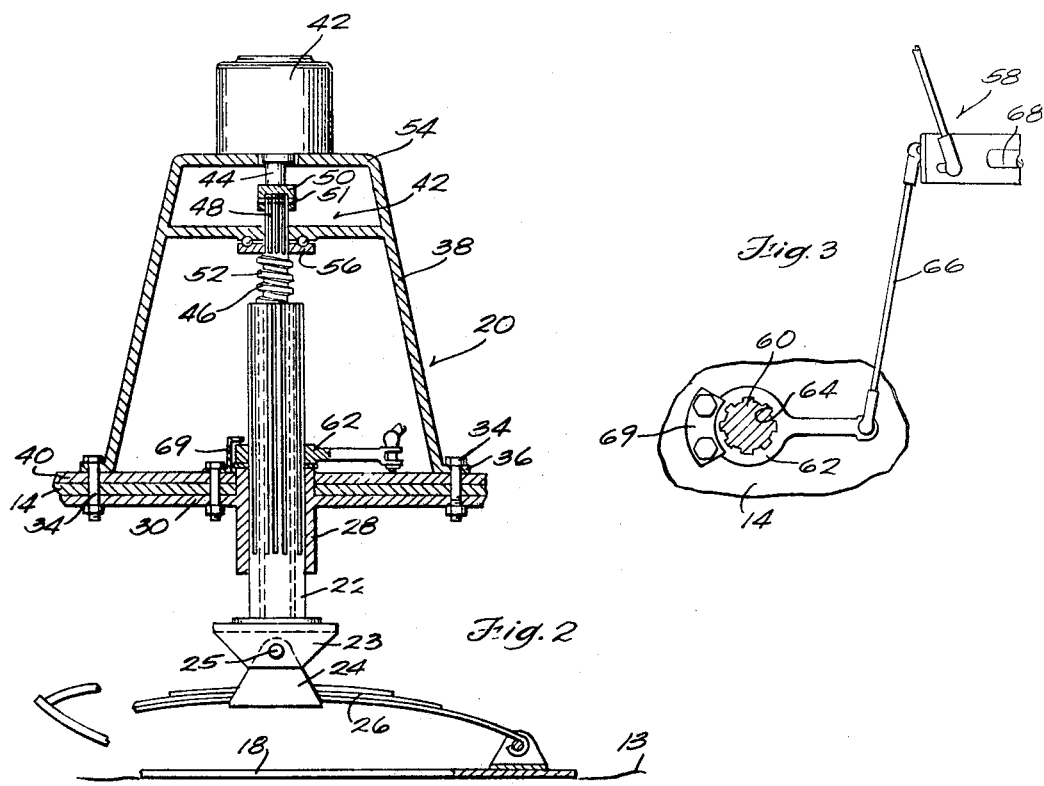
Inventor
Vernon C. Milward
By Wheeler, Wheeler, House & Clemency
Attorneys April 7, 1970 V. C. MILWARD 3,504,752
MECHANISM FOR SNOW VEHICLE
Filed Dec. 5, 1967 3 Sheets-Sheet 2

Inventor
Vernon C. Milward
By Wheler, Wheler, House & Clemency
Attorneys

April 7, 1970 V. C. MILWARD 3,504,752
MECHANISM FOR SNOW VEHICLE

Filed Dec. 5, 1967 3 Sheets-Sheet 3

Inventor
Vernon C. Milward
By
Wheeler, Wheeler, House & Clemency
Attorneys

United States Patent Office 3,504,752
Patented Apr. 7, 1970

3,504,752
MECHANISM FOR SNOW VEHICLE
Vernon Charles Milward, Peterborough, Ontario, Canada, assignor to Outboard Marine Corporation, Waukegan, Ill., a corporation of Delaware
Filed Dec. 5, 1967, Ser. No. 688,171
Int. Cl. B62m 27/00; B62b 13/00
U.S. Cl. 180—5        17 Claims

ABSTRACT OF THE DISCLOSURE

Disclosed herein is a snow vehicle with runners which are independently vertically adjustable to vary the distance of the runners from the frame and thus vary the tilt or attitude of the snow vehicle. Each runner is connected to the frame by a column which is movable through a vertically aligned sleeve secured to the snow vehicle frame. In certain embodiments, the columns are moved vertically by hydraulic motors. In other embodiments, movement of the columns is afforded by linkage operated by hand or pedal controls. External splines on the columns cooperate with an internal spline on a yoke to enable rotary movement of the column for steering purposes.

BACKGROUND OF INVENTION

Snow vehicles are conventionally provided with runners or skis to support the snow vehicle frame for travel along a snow covered surface. When the plane of the bottom of the runners is parallel to the surface, the runners have a tendency to skid or slide when negotiating a turn. Furthermore, in travel along the side of a hill, it is desirable that the snow vehicle maintain a horizontal position for stability and safety.

SUMMARY OF INVENTION

The invention provides vertically adjustable supports for the runners of a snow vehicle which can be controlled during vehicle movement to change the distance of each of the runners from the frame to vary the angle of tilt of the snow vehicle and thereby to facilitate negotiating a turn or to maintain a horizontal attitude during travel along an incline. Tilting the vehicle during a turn causes the plane of the bottom of the runners to be at an angle with respect to the surface, and thus minimizes slippage. In this regard, the runners are connected to columns which are reciprocal axially in vertically extending sleeves mounted to the frame of the snow vehicle.

In one embodiment, the movement of the column in the sleeve to vary the distance of the associated runner from the snow vehicle frame is afforded by a motor which drives a shaft threaded into an axial bore in the column. Rotation of the threaded shaft causes axial travel of the column in the associated sleeve.

In other embodiments, axial movement of a column in the sleeve is afforded by a linkage which can be controlled either by a hydraulic cylinder or by manual or foot operated controls.

To facilitate steering, i.e., rotating the columns to turn the runners, the columns are provided with external splines which cooperate with internal splines in yokes which surround the columns and are connected to a steering assembly.

Further objects and advantages of the invention will become apparent from the following description and accompanying drawings.

DRAWINGS

FIGURE 1 is a side perspective view of a snow vehicle embodying the present invention.

FIGURE 2 is an enlarged fragmentary vertical sectional view of the runner elevator assembly shown in FIGURE 1.

FIGURE 3 is a fragmentary top view of the connection between the elevator assembly and the steering assembly.

FIGURE 7 is a fragmentary perspective view of a snow vehicle embodying the device shown in FIGURE 6.

DETAILED DESCRIPTION

Figure 4:
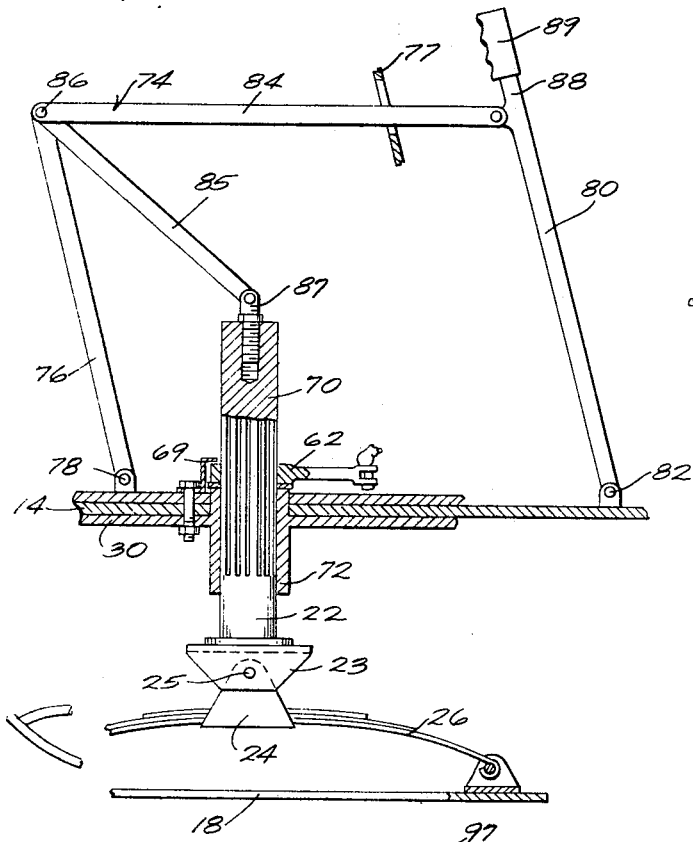
FIGURE 4 is a side elevational view of a modified embodiment of the invention with a manually operated linkage.

In the drawings, there is shown in FIGURE 1 a snow vehicle which is generally designated 10 and which includes a body 12 mounted on a frame 14. The forward end of the snow vehicle 10 is supported for travel on a surface 13 by right and left skis or runners 16 and 18 respectively.

The invention is principally directed to the provision of means for connecting the runners 16 and 18 to the frame to afford selective adjustment of the distance between the runners and the frame so as to vary the attitude or angle of inclination of the frame with respect to the surface to be traveled. When negotiating a turn in a snow vehicle, it is desirable that the plane of the bottom surface of the runner be transverse or at an angle to the plane of the surface to be traveled. With the plane of the runners transverse to the surface to be traveled, the direction of thrust of the runners against the surface 13 is at an angle with respect to the surface rather than parallel. Accordingly, tendency of the runners to slip along the surface 13 is minimized.

In the disclosed construction, this means comprises an elevator assembly 20 for each runner 16 and 18 including a column 22 having a gusset 23 which is pivotally connected to a ski spring bracket 24 by a pin or bolt 25. The bracket 24 is connected to leaf spring or springs 26 secured to the runners 16 and 18. The assembly also includes a sleeve 28 integral with a bottom plate 30 which is bolted to the frame 14 of the snow vehicle 10 by bolts 34 extending through an outturned flange 36 of a bell housing 38 and through a top plate 40.

The means for affording selective adjustment of the distance of the runners from the frame includes means connected to the columns for selectively moving the columns through the sleeves to change the distance between the runner and the frame during vehicle movement. In the FIGURE 1 and FIGURE 2 constructions, such means comprises a reversible motor 42 which has an output shaft 44. The output shaft 44 is connected to a second shaft 46 by a spline 48 at one end of the shaft 46 and a coupling 50 provided with an internal spline. A pin 51 can be used to secure the output shaft 44 to the shaft 46. The shaft 46 is rotatably supported by bearings 56 mounted in the bell housing 38 and has a threaded portion 52 which extends into and threadably engages a threaded axial aperture 53 in the column 22. The motor 42 can be operated hydraulically or by some other source of power and is supported by a bracket 54 which is connected to bell housing 38.

The motor 42 disclosed in FIGURES 1 and 2 can be energized by suitable controls (not shown). In operation, upon energization of the motor 42, rotation of the shaft 46 in one direction will cause the sleeve 28 to travel upwardly over the column 22 to raise the frame 14 above the surface 13. Rotation of the shaft 46 in the opposite direction will cause the sleeve 28 to travel downwardly over the column 22 to lower the frame toward the surface 13.

The invention also provides means for connecting the runners 16, 18 to a steering assembly 58 for turning the runners to steer the snow vehicle. In the disclosed construction, such means comprises an external spline 60 on the column and a yoke 62 which has an internal spline 64 which interfits with the spline 60. The yoke 62 is connected to a steering rod 66 which is connected to the steering shaft 68. Axial travel of the yoke 62 during axial movement of the column 22 is prevented by a retainer bracket 69 bolted to the frame 14.

Referring to FIGURE 4, there is shown a further embodiment of the invention wherein the means connected to the columns for selectively moving the columns through the sleeves includes a linkage 74 connected to a column 70 which is reciprocal axially in a sleeve 72. The linkage 74 includes a first link 76 having a lower end pivotally connected at 78 to the frame 14, a second link 80 generally parallel to the first link 76 and having a lower end pivotally connected at 82 to the frame 14.

The first and second links 76 and 80 are connected by a third link 84 which is located above the column 70 and which passes through an opening in one wall 77 of the vehicle body. The linkage includes a fourth link 85 which has an upper end connected to the connection 86 between the first link 76 and the third link 84. The other end of the fourth link is pivotally connected to a stud 87 threaded into the upper end of the column 70. Actuation of the linkage 74 to move column 70 or to move the sleeve and frame relative to the column 70 is afforded by an extension 88 which is part of the second link 80 and which is provided with a hand grip 89. In operation of the linkage disclosed in FIGURE 4, forward movement of the link 80, by manual pressure, will cause upward travel of the sleeve 72 over the column 70. Rearward movement of the link 80, by manual pressure, causes downward travel of the sleeve 72 over the column 70.

Figure 5:
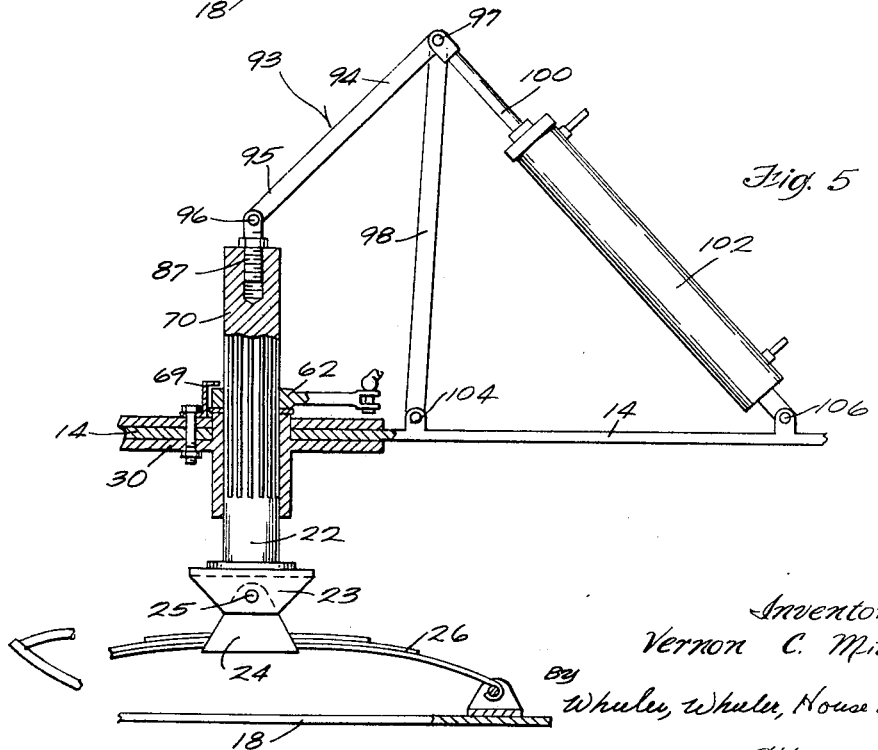
FIGURE 5 is an elevational view of a further embodiment of the invention employing a hydraulic cylinder.

A further embodiment of the invention is shown in FIGURE 5. In this embodiment the means provided for connecting the runners to the frame comprises a column 70 and a linkage 93 which includes a first link 94 which has a lower end 95 pivotally connected to a stud 87 threaded into the upper end of the column 70 and which has an upper end pivotally connected at 97 to the upper end of a second link 98 and to a piston rod 100 of a oe-way or two-way hydraulic power cylinder 102. The lower end of the link 98 is pivotally connected at 104 to the frame 14, and the lower end of the power cylinder 102 is pivotally connected at 106 to the frame 14. A suitable hydraulic circuit (not shown) can be employed to selectively position the runner with respect to the frame by actuation of the hydraulic cylinder.

In operation, upon release of pressure in the cylinder, the weight of the snow vehicle will cause movement of the sleeve 72 over the column 70 and retraction of the piston rod. Actuation of the cylinder causes upward movement of the sleeve 72 over the column 70.

Figure 6:
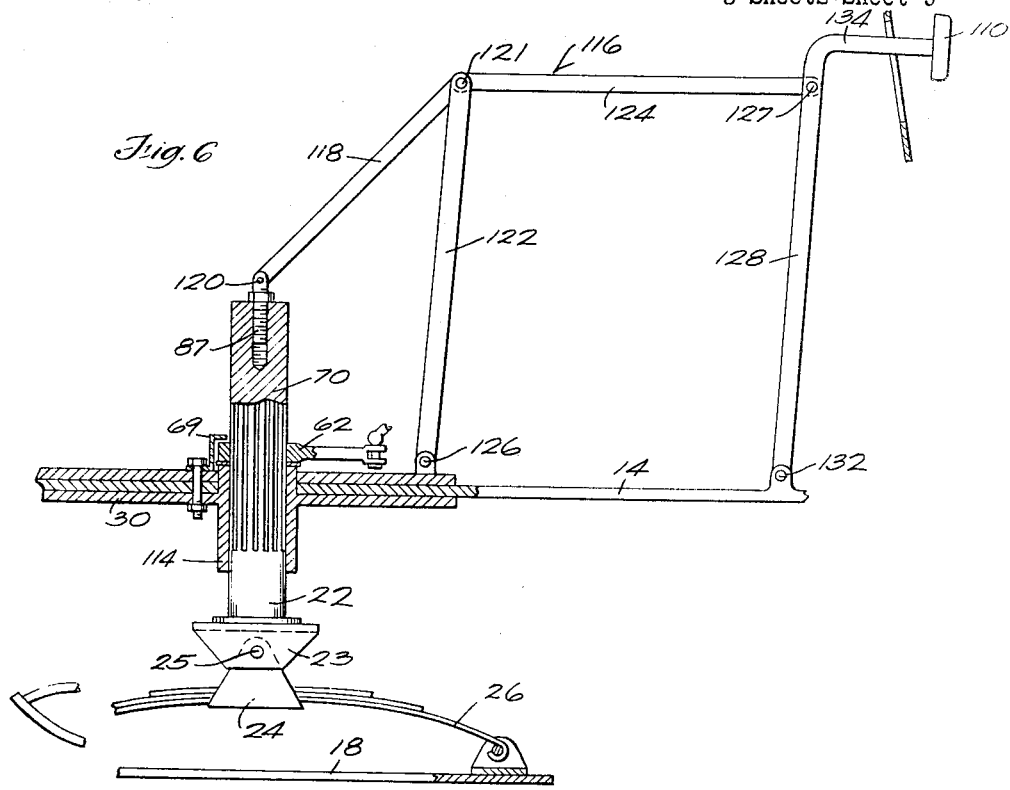
FIGURE 6 is an elevational view of an additional embodiment of the invention employing a pedal operated linkage.
Figure 4:
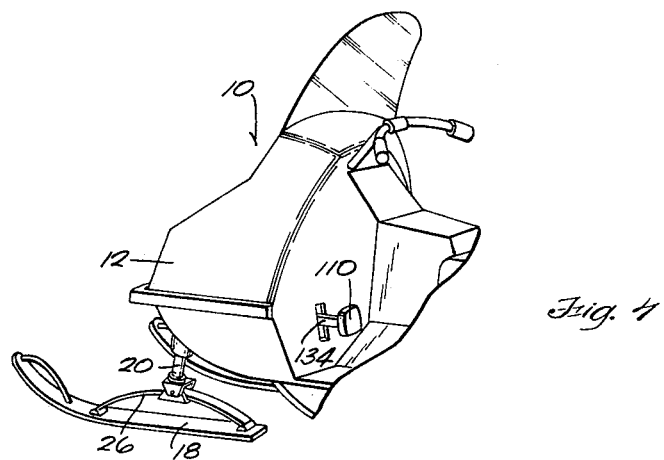

Referring to FIGURE 6, there is shown a further embodiment of the invention adapted to be controlled by a foot pedal 110. In this embodiment, the means provided for vertically adjustable connecting the runners to the frame comprises a column 70 movable axially in a sleeve 114 and a linkage 116 which includes a first link 118 having a lower end pivotally connected to the bolt 87 and an upper end pivotally connected at 121 to a second link 122 and at the forward end of a third link 124. The lower end of the link 122 is pivotally connected at 126 to the frame. The rearward end of a third link 124 is pivotally connected at 127 to a fourth link 128 which is generally parallel to the second link 122, and which, at its lower end, is pivotally connected at 132 to the frame 14. Actuation of the linkage to move the column is facilitated by the pedal 110 which is connected to a bent portion 134 of the link 128. As shown in FIGURE 7, the foot pedal 110 is desirably located in a position appropriate for operation by the snow vehicle driver.

In operation of the linkage shown in FIGURE 6, forward movement of the pedal causes the column 70 to travel downwardly to increase the distance between the runner 18 and the frame 14. Upon release of pressure on the pedal, the weight of the vehicle will cause the column to travel upwardly through the sleeve.

Various of the features of the invention are set forth in the following claims.

What is claimed is:

1. A snow vehicle including a frame, a track at one end of said frame, a runner at the other end of said frame cooperating with said track to support said frame above a surface, and means including a movable rigid actuating member mounted on said frame and connected to said runner for selectively varying the distance between said runner and said frame to vary the height and attitude of said frame with respect to the surface independently of the weight of the user.

2. A snow vehicle including a frame, a runner mounted on the frame, a sleeve extending through and supported by a portion of said frame, a column extending through said sleeve, said column being movable axially with respect to said sleeve and having a lower end connected to said runner, and means including a movable rigid actuating member mounted on said frame and operably connected to said column for selectively moving said column through said sleeve to change the distance between said runner and said frame.

3. The improvement of claim 2 wherein said means connected to said column for selectively moving said column through said sleeve comprises a motor connected to said column.

4. A snow vehicle in accordance with claim 2 wherein said actuating member comprises a shaft having a threaded portion, and said means connected to said column for selectively moving said column through said sleeve also includes means rotatably supporting said shaft on said frame, a threaded axial aperture located in said column and threadably receiving said threaded portion of said shaft, and a motor connected to said shaft to rotate said shaft so as to move said column axially of said sleeve.

5. A snow vehicle in accordance with claim 2 wherein said member comprises one component of a linkage connected to said column.

6. The improvement of claim 2 wherein said means connected to said column for selectively moving said column through said sleeve comprises first and second generally parallel links located on opposite sides of said column, each of said parallel links having a lower end pivotally connected to said frame, a third link connecting said first and second links and located above said column, a fourth link having one end pivotally connected to one of said first, second and third links, the other end of said fourth link being pivotally connected to said column, and a handle connected to one of said first, second and third links to move said linkage relative to said frame so as to move said column axially of said sleeve.

7. The improvement of claim 6 including a steering assembly on said frame and means for connecting said runner to said steering assembly for steering movement of said runner.

8. The improvement of claim 7 wherein said means for connecting said runner to said steering assembly for steering movement of said runner comprises an external spline on said column and a yoke around said column, said yoke having an internal spline which interfits with said spline on said column, said yoke being connected to said steering assembly to afford steering movement of said runner responsive to actuation of said steering assembly.

9. The improvement of claim 2 wherein said means connected to said column for selectively moving said column through said sleeve comprises a first link, a second link, said first link having one end pivotally connected to said column and the other end pivotally connected to said second link, said second link having a lower end pivotally connected to said frame, and a hydraulic cylinder having a piston rod pivotally connected to the connection between said first and said second links and said cylinder being connected to said frame.

10. The improvement of claim 9 including a steering assembly on said frame and means for connecting said runner to said steering assembly for steering movement of said runner.

11. The improvement of claim 10 wherein said means for connecting said runner to said steering assembly for steering movement of said runner comprises an external spline on said column and a yoke around said column, said yoke having an internal spline which interfits with said spline on said column, said yoke being connected to said steering assembly to afford steering movement of said runner responsive to actuation of said steering assembly.

12. The improvement of claim 2 wherein said means connected to said column for selectively moving said column through said sleeve comprises a first link, a second link, said first link having one end pivotally connected to said column and the other end pivotally connected to said second link, said second link having a lower end pivotally connected to said frame, a third link generally parallel to said second link, said third link having a lower end pivotally connected to said frame, a fourth link having one end pivotally connected to the connection between said first and said second links, said third link having the other end pivotally connected to said fourth link, and a pedal connetced to said linkage for movement of said column axially in said sleeve responsive to foot pressure.

13. The improvement of claim 12 including a steering assembly on said frame and means for connecting said runner to said steering assembly for steering movement of said runner.

14. The improvement of claim 13 wherein said means for connecting said runner to said steering assembly for steering movement of said runner comprises an external spline on said column and a yoke around said column, said yoke having an internal spline which interfits with said spline on said column, said yoke being connected to said steering assembly to afford steering movement of said runner responsive to actuation of said steering assembly.

15. The improvement of claim 2 including a steering assembly on said frame and means for connecting said runner to said steering assembly for steering movement of said runner.

16. The improvement of claim 15 wherein said means for connecting said runner to said steering assembly for steering movement of said runner comprises an external spline on said column and a yoke around said column, said yoke having an internal spline which interfits with said spline on said column, said yoke being connected to said steering assembly to afford steering movement of said runner responsive to actuation of said steering assembly.

17. A snow vehicle comprising a frame, a track at one end of said frame, runners at the other end of said frame cooperating with said track to support said frame above a surface, generally vertical sleeves extending through and supported by a portion of said frame, columns extending through said sleeves, said columns each having an external spline, each of said columns having a lower end, said lower ends of said columns being connected to said runners, a yoke around each of said columns, said yokes each having an internal spline which respectively interfit with said splines on said columns, a steering assembly connected to said yokes for steering movement of said runners, and rigid means mounted on said frame and operably connected to said through said sleeves to change the distance between said runners and said frame during vehicle movement.

References Cited

UNITED STATES PATENTS

| 1,661,511 | 3/1928 | Steffler | 180—5 |
| 3,338,589 | 8/1967 | Barton et al. | 280—21 |

FOREIGN PATENTS

| 142,899 | 2/1931 | Switzerland. |

BENJAMIN HERSH, Primary Examiner

ROBERT R. SONG, Assistant Examiner

U.S. Cl. X.R.

280—16

PO-1050
(5/69)

UNITED STATES PATENT OFFICE
CERTIFICATE OF CORRECTION

Patent No. 3,504,752                 Dated   April 7, 1970

Inventor(s)  Vernon C. Milward (Outboard Marine Corporation)

It is certified that error appears in the above-identified patent and that said Letters Patent are hereby corrected as shown below:

Column 6, Line 30,    After "said" (second occurance" INSERT
      CLAIM 17,              ---columns for selectively moving
                                  said columns axially---

SIGNED AND
SEALED
JUL 21 1970

(SEAL)
Attest:

Edward M. Fletcher, Jr.

Attest:

WILLIAM E. SCHUYLER, JR.
Commissioner of Patents